United States Patent
Gunzenhauser et al.

(10) Patent No.: US 11,292,381 B2
(45) Date of Patent: Apr. 5, 2022

(54) SPLASH GUARD FOR CONCRETE BUGGY

(71) Applicant: Mon River Supply Co., West Elizabeth, PA (US)

(72) Inventors: Brian Gunzenhauser, Bethel Park, PA (US); David Stuebner, Elizabeth, PA (US)

(73) Assignee: Mon River Supply Co., Elizabeth, PA (US)

( * ) Notice: Subject to any disclaimer, the term of this patent is extended or adjusted under 35 U.S.C. 154(b) by 94 days.

(21) Appl. No.: 17/002,831

(22) Filed: Aug. 26, 2020

(65) Prior Publication Data

US 2021/0061158 A1 Mar. 4, 2021

Related U.S. Application Data

(60) Provisional application No. 62/891,454, filed on Aug. 26, 2019.

(51) Int. Cl.
*B60P 7/04* (2006.01)

(52) U.S. Cl.
CPC ............. *B60P 7/04* (2013.01); *B60Y 2200/14* (2013.01)

(58) Field of Classification Search
CPC .. B62D 51/005; B60P 1/00; B60P 1/04; B60P 7/04
USPC ......... 296/100.11, 100.16; 298/1 C; 150/166
See application file for complete search history.

(56) References Cited

U.S. PATENT DOCUMENTS

| | | | |
|---|---|---|---|
| 2,674,489 A * | 4/1954 | Maxon, Jr. | B60P 1/26 298/17 R |
| 3,292,805 A * | 12/1966 | Basil | B60P 1/04 414/498 |
| 4,645,264 A * | 2/1987 | Morrison | B60P 1/16 165/41 |
| 5,772,389 A | 6/1998 | Feller | |
| 6,155,648 A | 12/2000 | Dombek et al. | |
| 6,322,151 B2 | 11/2001 | Dombek et al. | |
| 6,447,053 B1 | 9/2002 | McDonald | |
| 6,578,924 B2 | 6/2003 | Jansen et al. | |
| 6,619,754 B1 | 9/2003 | Dombek et al. | |
| 6,712,419 B1 | 3/2004 | Gothier | |
| 6,955,404 B1 | 10/2005 | Best et al. | |
| 7,399,038 B2 | 7/2008 | Vandewinckel et al. | |
| 8,876,217 B1 | 11/2014 | Medlen et al. | |

(Continued)

FOREIGN PATENT DOCUMENTS

| | | | | |
|---|---|---|---|---|
| AU | 2013203901 A1 * | 6/2014 | | B60P 1/04 |
| DE | 102014016029 A1 * | 5/2016 | | B60P 7/0876 |

(Continued)

*Primary Examiner* — Joseph D. Pape
*Assistant Examiner* — Veronica Marie Shull
(74) *Attorney, Agent, or Firm* — McKay Law

(57) ABSTRACT

A splash guard for a power buggy bucket. A first bracket member has a first lower end and a first upper end, the first lower end adapted to attach to a bucket interior side wall of a bucket of a power buggy with the first upper end extending upward. A second bracket member has a second lower end and a second upper end, the second lower end adapted to attach to the bucket interior side wall in opposing relation to the first bracket member with the second upper end extending upward. A rod inserts into each bracket member. A non-rigid apron attaches to the rod, wherein the apron partially covers the bucket to deflect the pour.

18 Claims, 6 Drawing Sheets

(56) References Cited

U.S. PATENT DOCUMENTS

| | | |
|---|---|---|
| 10,266,092 B2 | 4/2019 | Gardner |
| 10,384,704 B2 | 8/2019 | Fielder |
| 2004/0040761 A1* | 3/2004 | Burt ................ B60B 11/00 180/69.4 |
| 2006/0119164 A1* | 6/2006 | Heskin ............. B60P 1/283 298/1 C |
| 2016/0052440 A1* | 2/2016 | Young ............. B62D 61/065 298/1 C |

FOREIGN PATENT DOCUMENTS

| | | | |
|---|---|---|---|
| KR | 200399493 Y1 | * | 10/2005 |
| KR | 101617102 B1 | * | 4/2016 |

* cited by examiner

SPLASH GUARD FOR CONCRETE BUGGY

CROSS-REFERENCE TO RELATED APPLICATIONS

The present application claims benefit of provisional application Ser. No. 62/891,454, filed Aug. 26, 2019, the contents of which are incorporated herein by reference.

BACKGROUND

Field of the Related Art

The instant invention relates to implements for hauling equipment. In particular, the invention comprehends a splash guard for draping over the bucket of a concrete buggy.

Description of the Related Art

Power buggies are often used to move debris and material from location-to-location at job sites. For example, power buggies were originally made to mechanically move concrete to the pour. In so doing, the concrete poured from power haulers tends to splash as it is emptied from the bucket. This impacts the job site and makes spot pouring difficult.

Accessories for power buggies are known in the art. For example, U.S. Pat. No. 7,399,038 to Vandewinckel et al. shows a mortar buggy with stake bed assembly providing a removable flat heavy duty base platform and a rear panel that can be fitted onto the chassis of an existing mortar buggy or similar conveyance in place of a hopper. The stake bed assembly provides removable front and side panels made of solid steel or similar alloy that can be configured to attach vertically in a hopper configuration or horizontally in an extended flat-bed configuration, to provide additional loading surface for long or large items. The stake bed assembly also provides for a removable front tailgate with the ability to hinge at both its top and bottom so that the front tailgate can swing either up or down.

The buckets of the power buggies are traditionally exposed at their top, much like a wheel-barrow, to serve the obvious need for efficiently receiving and dumping the material. Like the above, the prior art attempts to reduce spillage by providing swinging tail or front gates, similar to dump truck mechanisms. Such devices are cumbersome are not retrofitted to traditional buckets, indeed, modifying the power buggy itself, hence they are impractical and impossible for use on standard hoppers, i.e, as Vandewickel notes, "in place of the hopper".

There is a need then for a splash guard which attaches to the top of the bucket portions of these haulers in a retro-fitted fashion to reduce the spill or spray of the emptying concrete/material.

SUMMARY

The instant invention comprehends a splash guard for use over the top of the bucket portion of a power buggy. More specifically, the invention is a splash guard, comprising a first bracket member, the first bracket member having a first lower end and a first upper end, the first lower end adapted to attach to a bucket interior side wall of a bucket of the power buggy with the first upper end extending upward; a second bracket member, the second bracket member having a second lower end and a second upper end, the second lower end adapted to attached to the bucket interior side wall in opposing relation to the first bracket member with the second upper end extending upward; a rod for insertion into each the first bracket member and the second bracket such that the rod is positioned over an interior of the bucket; and, a non-rigid apron for attachment to the rod, wherein the apron partially covers the bucket.

Accordingly, the apron partially covers the bucket when the bucket is in an upward, non-pouring position and is deflected by a pour within the bucket as the bucket moves to a downward, pouring position such that the apron directs said pour over a front of the bucket to thereby reduce spillage.

DETAILED DESCRIPTION OF THE PREFERRED EMBODIMENT

Figure 1:
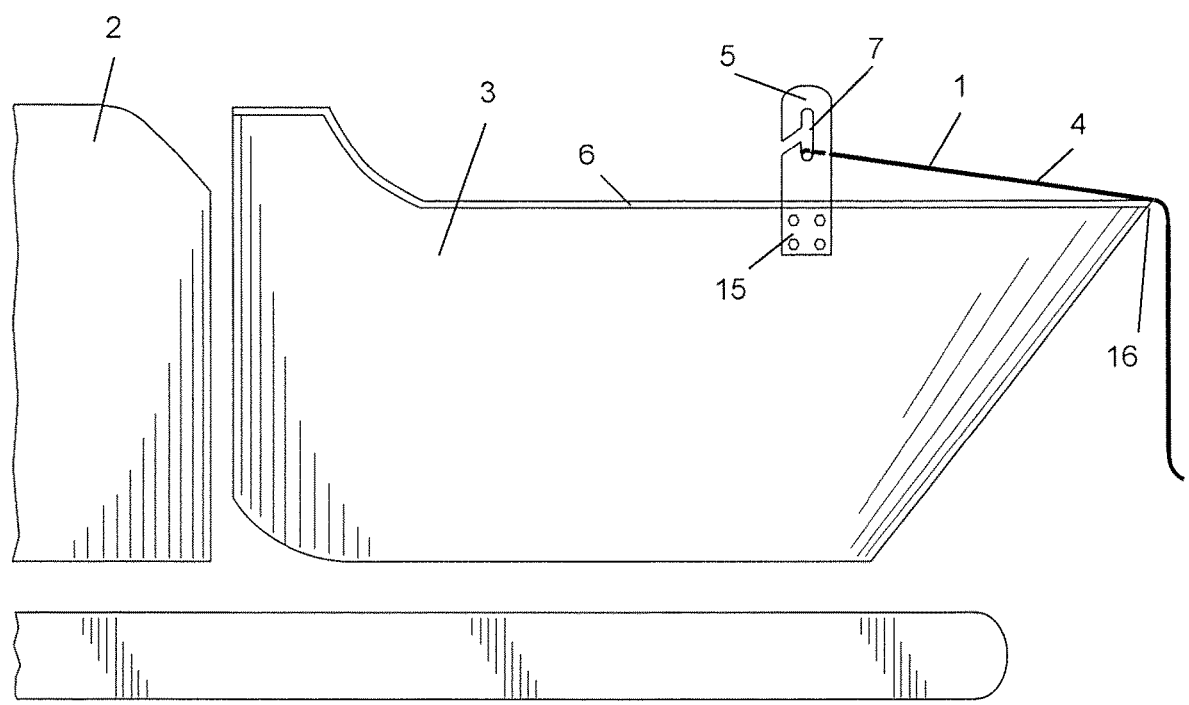
FIG. 1 shows a side view in elevation of the instant splash guard in use over a bucket of a concrete buggy.
Figure 2:
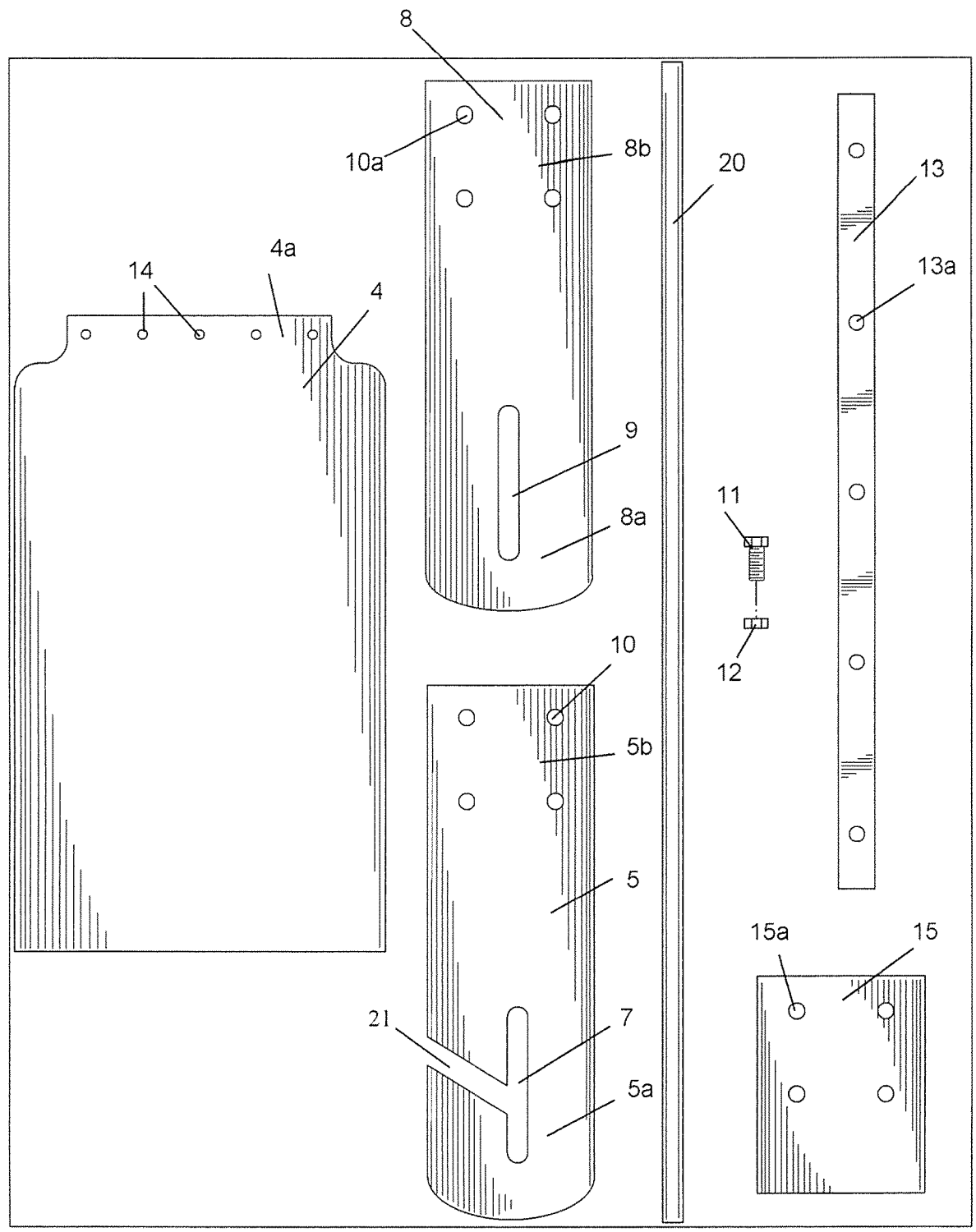
FIG. 2 shows a top exploded view of the various components.
Figure 3:
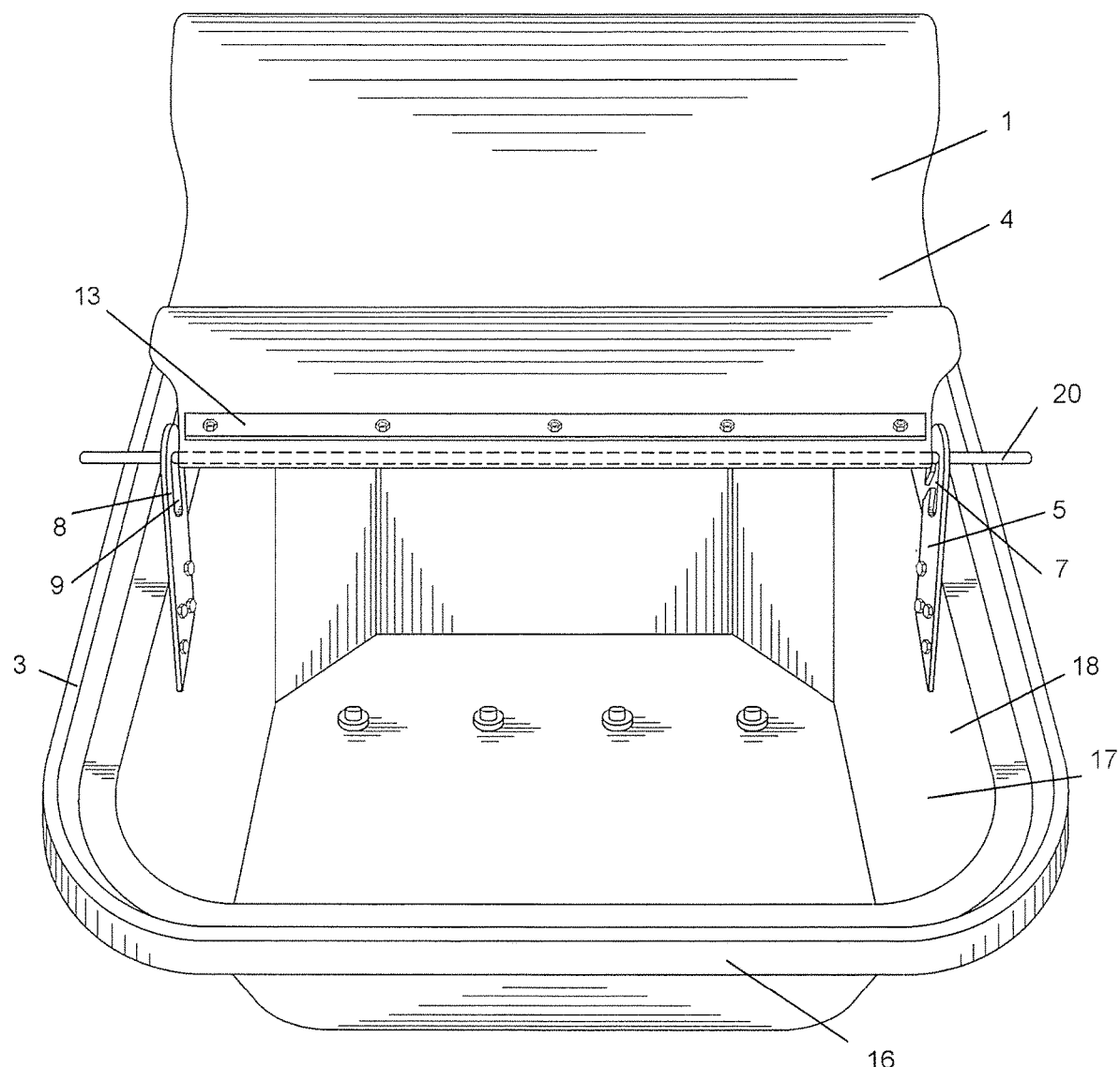
FIG. 3 shows a front perspective view.
Figure 4:
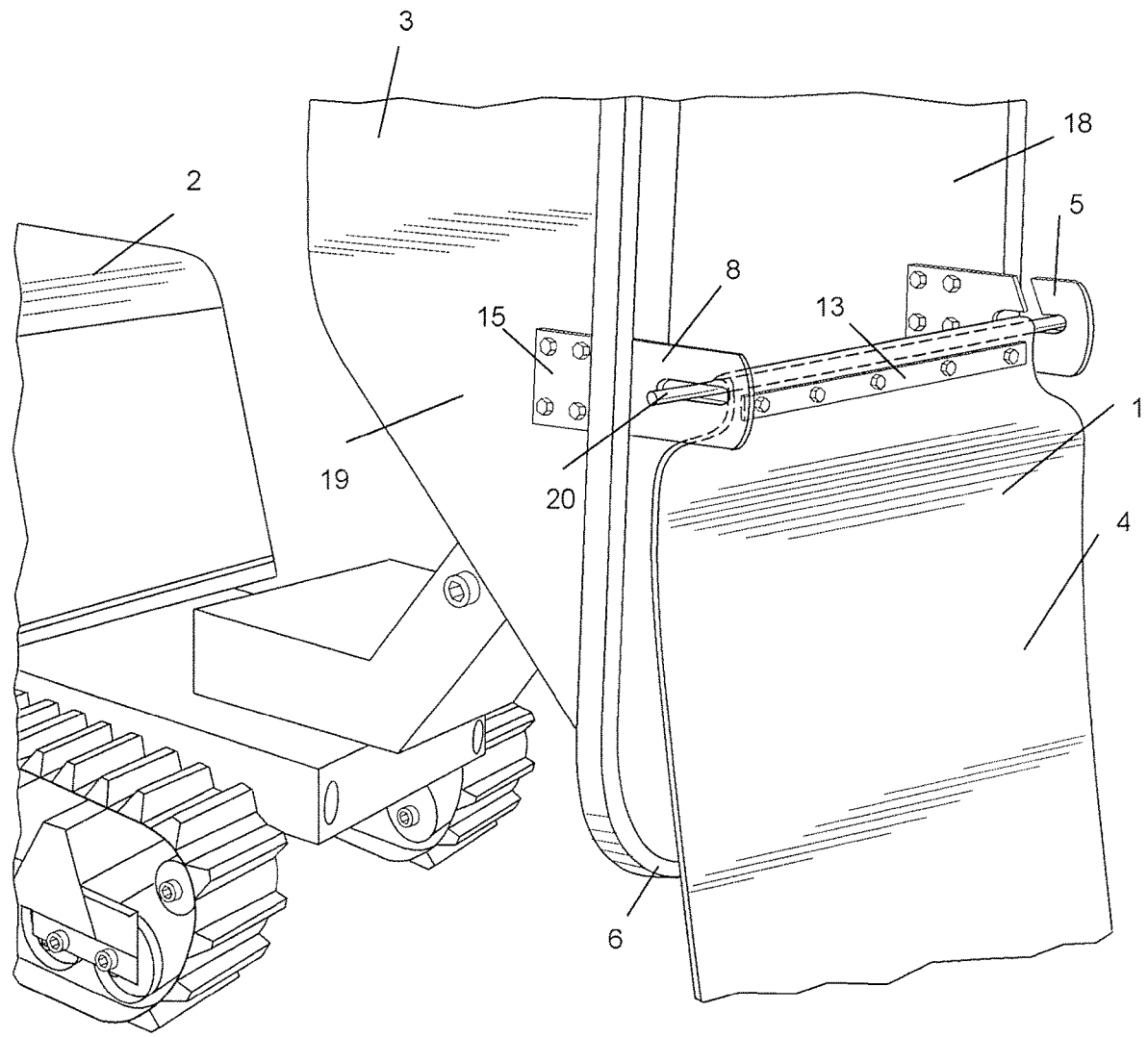
FIG. 4 shows a perspective view of the splash guard with the bucket in a downward, pouring position.
Figure 5:
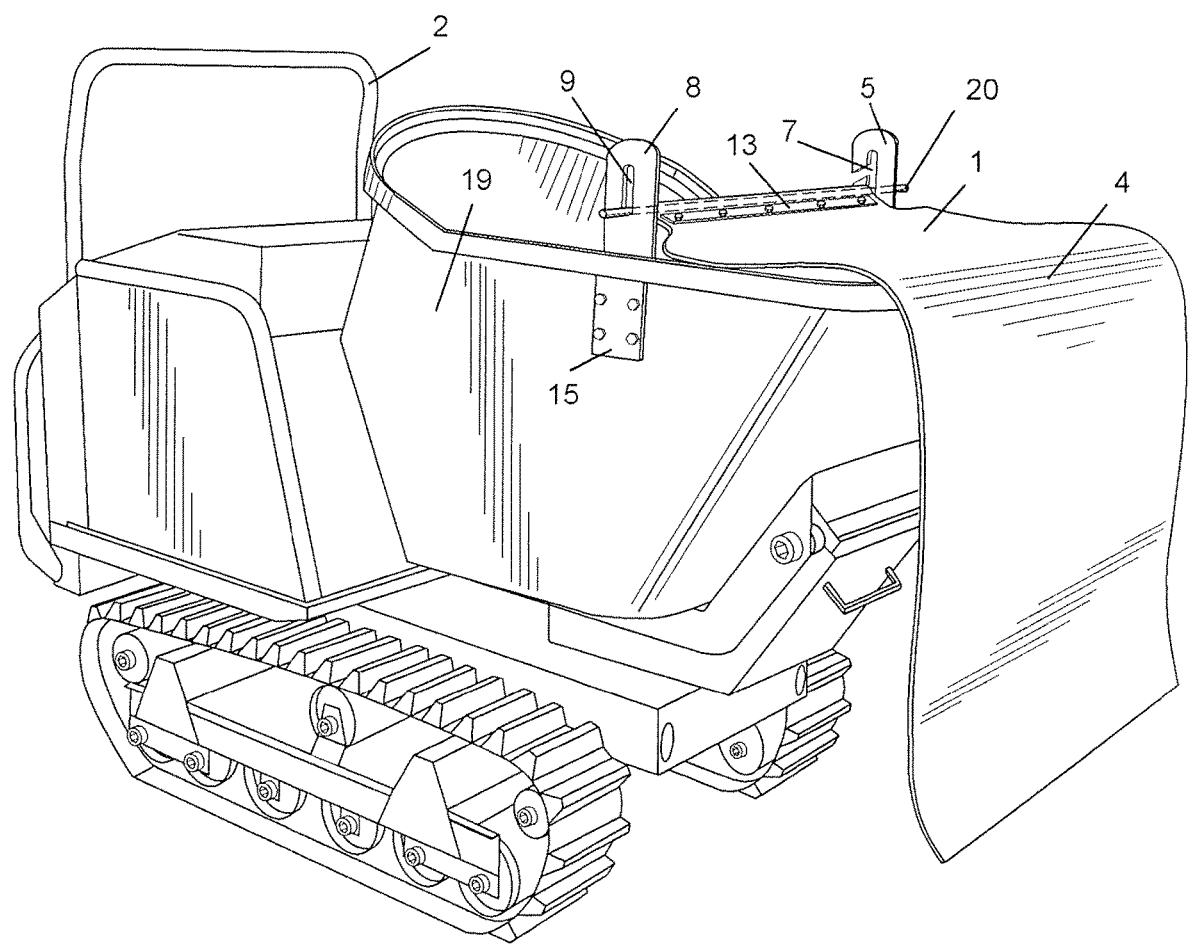
FIG. 5 shows a perspective view thereof with the splash guard and bucket in an upward, non-pouring position.
Figure 6:
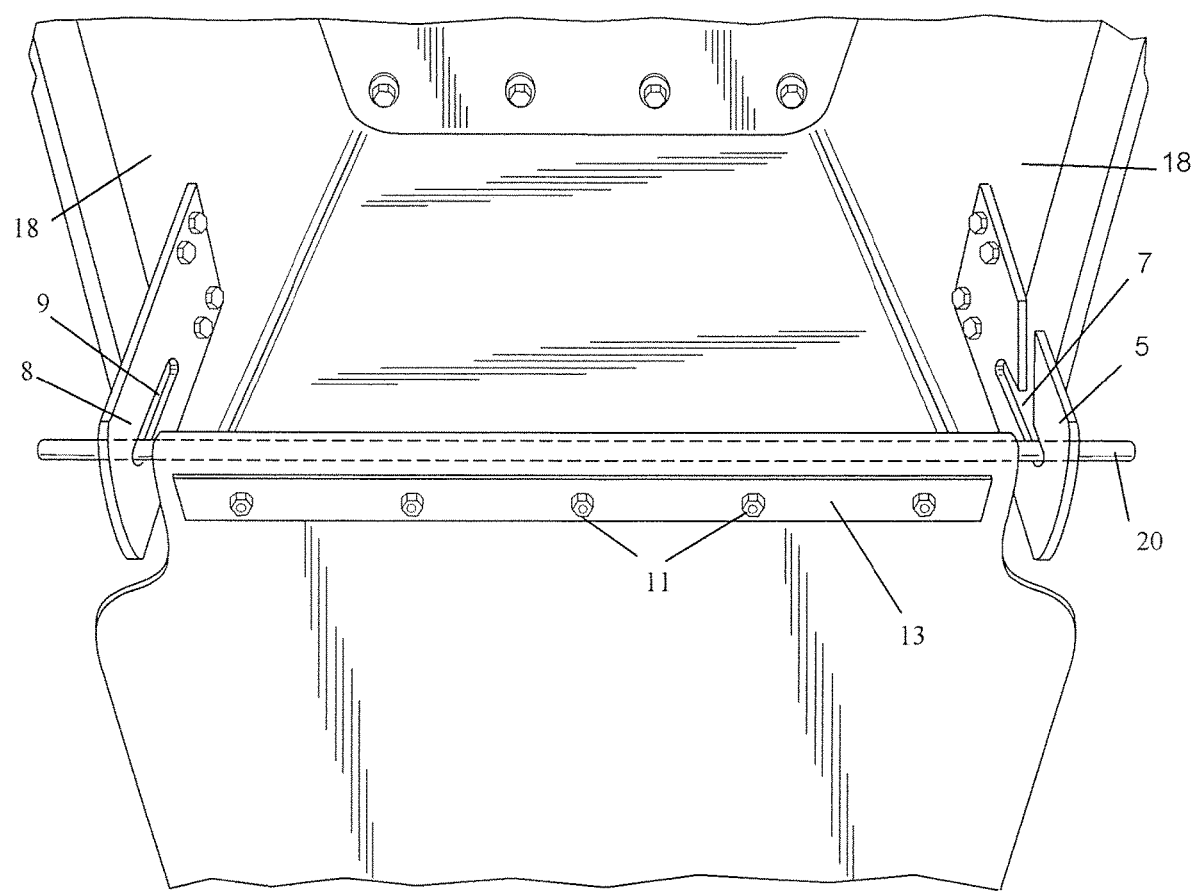
FIG. 6 shows a broken perspective view with the bucket in the downward position.

With reference then to FIGS. 1-6, shown is the instant splash guard 1, here shown in use on a power buggy 2. In the exemplar embodiment as described, the instant splash guard 1 is especially suited for use on a power buggy 2 used in pouring concrete, e.g. shown is a motorized hauler, or power buggy 2 with front-mounted bucket 3 which hydraulically lifts and dumps its contents. But it should be understood the splash guard 1 may be used on any bucket 3 that ideally would have an exposed top, which may of course also contain various articles other than concrete.

Bracket members 5, 8, preferably arranged as a pair although they can vary in number, include a first bracket member 5 and second bracket member 8. The pair of bracket members 5, 8 are attached to the bucket 3 of the power buggy 2, preferably within its interior 17, each upstanding vertically over the top bucket edge 6 as shown. More specifically, the first bracket member 5 has a first lower end 5b and a first upper end 5a. The first lower end 5b is adapted to attach to the bucket interior side wall 18 of the bucket 3 with the first upper end 5a thereby extending upward over top bucket edge 6. Any variety of fasteners such as bolts 11 and nuts 12 may be used for insertion through multiple first bolt holes 10 bored through the first lower end 5b. A T-slot 7 is defined at the first upper end 5a. The T-slot 7 is a generally T-shaped slot formed in the first upper end 5a but for a slightly angled insertion point, termed herein angular opening 21, which, with the aid of gravity, allows for insertion of rod 20, as further described.

The second bracket member 8 has a similar second lower end 8b and a second upper end 8a, the second lower end 8b adapted to attach to the bucket interior side wall 18 in opposing relation to the first bracket member 5 with the second upper end 8a extending upward. In the same way, any variety of fasteners such as bolts 11 and nuts 12 may be used for insertion through multiple second bolt holes 10a bored through the second lower end 8b to align and fasten the second bracket member 8 on the opposite interior side wall 18 relative to the first bracket member 5 as shown. An I-slot 9 is defined at second upper end 8a, which allows for retention of the same rod 20.

One or more plates 15 are provided to aid in fastening the bracket members 5, 8 to bucket 3. Each plate 15 has multiple plate holes 15a defined therethrough. The plates 15 are adapted to attach to a bucket exterior side wall 19 with the plate holes 15a in alignment with the first bolt holes 10 and the second bolt holes 10a to thereby removably secure each of the bracket members 5, 8 to the bucket 3 of power buggy 2. It should be understood that the plates 15 and the bracket member 5, 8 could also be switched such that bracket member 5, 8 is on the exterior of bucket 3 (not shown).

Accordingly, bracket members 5, 8, are adapted to receive rod 20, which fits into T-slot 7 and I-slot 9. In use, rod 20 is passed through angular opening 21, slid through I-slot 9, then allowed to drop down into both I-slot 9 and T-slot 7 to be removably retained therein. As such the rod 20 is retained in a position above the bucket 3, spanning its width (as shown in the figures).

An apron 4 is attached to rod 20. Although apron 4 may be rigid or semi-rigid, preferably apron 4 is a flexible, or non-rigid mat, typically made of rubber. As such, apron 4 can drape over the bucket 3. In the preferred embodiment, apron 4 is attached to rod 20 using a rigid (e.g. metal) plate or strip 13. Strip 13 has defined therein a plurality of strip holes 13a which then align with and are received by similar apertures 14 provided along the back edge 4a of apron 4. Back edge 4a is wrapped around rod 20 and strip 13 is driven through apertures 14 using any combination of fasteners, which then penetrate apron 4 (or an additional set of matching apertures, not shown) and secured using nuts 12.

It should be understood that other means to fasten the apron 4 to rod 20 are envisioned, such as by using S-shaped hooks that may pass through the back edge 4a (or slits thereof), then further hook onto rod 20. In either configuration, the splash guard 1 may be easily removed from the bucket 3 when not in use as the rod 20 and apron 4 are simply removed from the bracket members 5, 8.

In use therefore, the above components can be sold as a kit and retrofitted to a hauler/power buggy 2. Bracket members 5, 8 are attached to bucket 3. Apron 4 is affixed to rod 20, then rod with apron 4 are inserted into bracket members 5, 8 (either before or after the bucket is filled). Accordingly, the apron 4 partially covers the bucket 3 when the bucket 3 is in an upward, non-pouring position and is deflected by a pour within the bucket 3 as the bucket 3 moves to a downward, pouring position such that the apron 4 directs said pour over a front of the bucket 3 to thereby reduce spillage.

We claim:

1. A splash guard for a power buggy, comprising:
   a pair of bracket members for attachment to a bucket of said power buggy, each said bracket member configured to upstand vertically over a top bucket edge of said bucket;
   a rod for insertion into said bracket members; and,
   an apron for attachment to said rod, wherein said apron partially covers said bucket when said bucket is in an upward, non-pouring position, and said apron is deflected by a pour from said bucket as said bucket moves to a downward, pouring position such that said apron directs said pour over a front of said bucket.
2. The splash guard of claim 1, wherein said bracket members include a first bracket member and a second bracket member, said first bracket member having a first lower end and a first upper end, said first upper end having defined therein a T-slot.
3. The splash guard of claim 2, wherein said first lower end has defined therein multiple first bolt holes.
4. The splash guard of claim 3, wherein said second bracket member has a second lower end and a second upper end, said second upper end having defined therein an I-slot.
5. The splash guard of claim 4, wherein said second lower end has defined therein multiple second bolt holes.
6. The splash guard of claim 5, further comprising one or more plates having plate holes, said plates adapted to attach to a bucket exterior side wall with said plate holes in alignment with said first bolt holes and said second bolt holes to thereby removably secure each said first bracket member and said second bracket member to said bucket.
7. The splash guard of claim 1, wherein said apron has apertures defined along a back edge thereof.
8. The splash guard of claim 7, further comprising a strip adapted to attach along said back edge to thereby secure said apron around said rod.
9. A splash guard, comprising:
   a first bracket member, said first bracket member having a first lower end and a first upper end, said first lower end adapted to attach to a bucket interior side wall of a bucket of a power buggy with said first upper end extending upward;
   a second bracket member, said second bracket member having a second lower end and a second upper end, said second lower end adapted to attach to said bucket interior side wall in opposing relation to said first bracket member with said second upper end extending upward;
   a rod for insertion into each said first bracket member and said second bracket such that said rod is positioned over an interior of said bucket; and,
   a non-rigid apron for attachment to said rod, wherein said apron partially covers said bucket.
10. The splash guard of claim 9, wherein said first upper end has defined therein a T-slot.
11. The splash guard of claim 10, wherein said T-slot is defined by an angular opening to receive said rod.
12. The splash guard of claim 9, wherein said second upper end has defined therein an I-slot.
13. The splash guard of claim 9, wherein said first lower end has defined therein multiple first bolt holes.
14. The splash guard of claim 9, wherein said second lower end has defined therein multiple second bolt holes.
15. The splash guard of claim 13, further comprising one or more plates having plate holes, said plates adapted to attach to a bucket exterior side wall with said plate holes in alignment with said first bolt holes to thereby removably secure said first bracket member.
16. The splash guard of claim 14, further comprising one or more plates having plate holes, said plates adapted to attach to a bucket exterior side wall with said plate holes in alignment with said second bolt holes to thereby removably secure said second bracket member.
17. The splash guard of claim 9, wherein said apron has apertures defined along a back edge thereof.
18. The splash guard of claim 17, further comprising a strip adapted to attach along said back edge to thereby secure said apron around said rod.

\* \* \* \* \*